United States Patent [19]

Yagi

[11] 4,366,253
[45] Dec. 28, 1982

[54] PHOSPHATE GLASS COMPOSITIONS, AND GLASS-CERAMIC MATERIALS, AND METHODS OF MAKING THE SAME

[75] Inventor: Motohiko Yagi, Odawara, Japan

[73] Assignee: Fuji Photo Film Co., Ltd., Kanagawa, Japan

[21] Appl. No.: 176,837

[22] Filed: Aug. 11, 1980

[30] Foreign Application Priority Data

Aug. 10, 1979 [JP] Japan ................................ 54-101241

[51] Int. Cl.$^3$ ............................ C03C 3/04; C03C 3/08
[52] U.S. Cl. ........................................ 501/63; 3/1.9;
65/33; 252/301.4 P; 501/4; 501/5; 501/10;
501/39; 501/46; 501/47; 501/48; 501/64;
501/66; 501/67; 501/77; 501/78
[58] Field of Search ................... 106/54, 39.6, 39.8;
501/63, 64, 67, 77, 78, 4, 10, 42; 252/301.4 P

[56] References Cited

U.S. PATENT DOCUMENTS

| 1,292,147 | 1/1919 | Taylor | 106/54 |
|---|---|---|---|
| 1,961,603 | 6/1934 | Berger | 106/54 |
| 3,241,935 | 3/1966 | Stookey | 106/39.6 X |
| 3,282,711 | 11/1966 | Lin | 501/42 |
| 3,519,445 | 7/1970 | MacDowell et al. | 501/10 |
| 3,522,191 | 7/1970 | Turner et al. | 501/63 X |
| 3,876,436 | 4/1975 | Lythgoe | 106/54 X |
| 3,905,047 | 9/1975 | Long | 3/1.9 |
| 3,942,991 | 3/1976 | Baak | 106/54 X |
| 3,981,736 | 9/1976 | Broemer et al. | 3/1.9 X |
| 4,127,415 | 11/1978 | Quackenbush et al. | 501/47 |
| 4,223,412 | 9/1980 | Aoyagi et al. | 3/1.9 |
| 4,248,732 | 2/1981 | Myers et al. | 106/54 X |

FOREIGN PATENT DOCUMENTS

| 400743 | 11/1933 | United Kingdom | 501/77 |
|---|---|---|---|
| 1174475 | 12/1969 | United Kingdom | 106/39.6 |
| 155273 | 6/1963 | U.S.S.R. | |
| 162925 | 5/1964 | U.S.S.R. | 501/63 |
| 2445298 | 6/1969 | U.S.S.R. | 501/63 |
| 371180 | 2/1973 | U.S.S.R. | 501/66 |

OTHER PUBLICATIONS

Kreidl, N. J. et al., "Phosphate Glasses", J. Am. Cer. Soc. 24 (1941) pp. 372-378.
GLASTECHNISCHE BERICHTE, 1951, Glasses 106-110, 134, 135, 147 at p. 173, Glasses H 50 and H 56, Table 4, at p. 176.

*Primary Examiner*—Helen M. McCarthy
*Attorney, Agent, or Firm*—Sughrue, Mion, Zinn, Macpeak & Seas

[57] ABSTRACT

Phosphate glass compositions are described comprising from 8 to 35 wt % $P_2O_5$, from 8 to 48 wt % $SiO_2$ and $GeO_2$, provided that the GeO content is not more than 6 wt %, from 3 to 18 wt % $B_2O_3$, from 16 to 28 wt % $Al_2O_3$, and from 8 to 33 wt % CaO, MgO, SrO, and BaO, provided that the sum of the MgO, SrO, and BaO contents is not more than 15 wt %, and wherein the sum of the above-described oxides comprises at least 88 wt % of the total composition and the ratio of the sum of the CaO, MgO, SrO and BaO contents to the $P_2O_5$ content ranges from 0.6/1 to 1.4/1 and wherein the amount of alkali metal oxide is less than 1%, certain of said compositions can be converted to a glass-ceramic material by a thermal treatment for crystallization which includes the steps, in sequence, of (1) melting a glass composition, (2) molding the melted glass composition, (3) cooling the resulting molded composition to its transformation temperature or less, and (4) allowing phosphate crystal to separate out as a main crystal phase by a re-heating treatment under conditions such that the molded shape is retained.

11 Claims, 2 Drawing Figures

PHOSPHATE GLASS COMPOSITIONS, AND GLASS-CERAMIC MATERIALS, AND METHODS OF MAKING THE SAME

BACKGROUND OF THE INVENTION

1. Field of the Invention

This invention relates to novel glass compositions and glass-ceramic materials made by heating such glass compositions in order to crystallize them and further, to methods for making the glass compositions and glass-ceramic materials.

More particularly, the present invention relates to the glass compositions which belong basically to the five-component system comprising of $P_2O_5$, $SiO_2$, $B_2O_3$, $Al_2O_3$ and $M^{2+}O$ (wherein $M^{2+}$ is an alkaline earth metal), and which are characterized by their relatively high contents of calcium phosphates and the substantial absence of alkali metal oxides therein, and which further have the advantage that they can be molded at relatively low temperatures notwithstanding their high transformation temperatures.

Furthermore, the invention relates to novel glass compositions which can be readily transformed into glass-ceramic materials having higher mechanical strength by thermal treatments for crystallization, and that can serve not only as a bioglass, a bioglass-ceramic, etc., but also as useful materials having various other purposes.

2. Description of the Prior Art

Japanese Patent Publication No. 12,576/61 discloses a method of making semicrystalline ceramics of a $SiO_2$-$Ca_2P_2O_7$-$Al_2O_3$ type system, which includes the steps, in sequence, of melting a glass composition comprising from 30 to 48 wt% silica, from 34 to 54 wt% calcium pyrophosphate, and from 15 to 21 wt% alumina, wherein the ratio of the calcium pyrophosphate content to the alumina content should be adjusted to at least 1.85/1, and the above-described components should comprise at least 95 wt% of the composition; cooling the molten glass composition to make a glass product; heating the glass product to a temperature of from 850° C. to 1,050° C. at a heating rate of about 300° C./hour or less; and maintaining the temperature of the glass product till the linear coefficient of thermal expansion of the glass is increased beyond $90 \times 10^{-7}$ cm/cm°C. (at 0° to 300° C.). According to this method, semicrystalline ceramic products having attributes of bone china can be obtained.

In such a glass composition as described above, which contains, converted to an oxide basis, from 19 to 30 wt% $P_2O_5$, from 30 to 48 wt% $SiO_2$, from 15 to 21 wt% $Al_2O_3$, and from 15 to 24 wt% CaO, to melt the glass batch at about 1,550° C. for at least 16 hours is required to obtain homogeneous glass. Accordingly, the above-described method suffers the disadvantage from an industrial point of view that a high temperature and a long heating time are required to melt the glass.

Japanese Patent Application (OPI) No. 73019/76 (The term "OPI" as used herein refers to a "published unexamined Japanese patent application".) discloses glass-ceramic materials of the calcium phosphate series, wherein glass compositions which have atomic ratios of calcium to phosphorus adjusted to 1.7/1 or less, and a phosphoric acid content of 10 wt% or more (calculated in a form of $P_2O_5$) are melted and then submitted to a thermal treatment for crystallization, resulting in transformation to a glass ceramic material having crystallinities comprising from 5 to 100 wt% of the final glass-ceramic material.

In these compositions, contents, calculated in the form of oxide, $P_2O_5$, is 10 wt% or more, and the calcium content, calculated in a form of CaO satisfy the relation CaO content (wt)$\leq 1.343 \cdot P_2O_5$ content (wt). The maximum of the $CaO/P_2O_5$ ratio (i.e., 1.343/1) is situated between the $CaO/P_2O_5$ ratio of calcium orthophosphate $Ca_3(PO_4)_2$ (=1.185/1) and that of tetracalcium phosphate $4CaO \cdot P_2O_5$ (=1.580/1), and somewhat larger than that of hydroxy apatite. Since the melting point of calcium orthophosphate is about 1,730° C., a very high temperature is required for the vitrification thereof and consequently, the vitrification is difficult. In addition, in the case of a sample composition shown in an example having a $CaO/P_2O_5$ ratio of about 0.790/1, which value corresponds to the $CaO/P_2O_5$ ratio of calcium pyrophosphate, the glass obtained by melting the batch in a scale of 1 kg portion and then cooling it slowly causes a surface devitrification phenomena. Therefore, it is difficult to cool a large quantity of molten glass in order that the glass to be obtained may not be devitrified.

Further, Japanese Patent Publication No. 8,970/76 disclosed glass-ceramic materials and methods of making them, wherein glass compositions containing as main components from 20 to 60 wt% $SiO_2$, from 5 to 40 wt% $P_2O_5$, from 2.7 to 20 wt% $Na_2O$, from 0.4 to 20 wt% $K_2O$, from 2.9 to 30 wt% MgO, and from 5 to 40 wt% CaO and, optionally, from 0.05 to 3 wt% fluorine, are melted, and, after being cooled, are reheated in order to crystallize and transform them into glass-ceramic materials.

The thus-obtained glass-ceramics are useful for biological implanting materials, with respect to which attention must be given to the ratio of the univalent alkali ions $Na^+/K^+$, because of leaching of these ions from the ceramic materials when the materials are implanted in animal bodies, and the fact that changes in the $Na^+/K^+$ ratio can have a great influence upon the bodies of animals. Such being the case, the relation between the $Na^+/K^+$ ratio in the glass composition and the increment of the $Na^+/K^+$ ratio in a leached solution was examined by a leaching test in boiled Ringer's solution, and the $Na^+/K^+$ ratio was found to be controlled within the scope of the above-described restrictions upon the compositions. Moreover, some other findings are also described therein, for instance: (1) the crystalline phase formed by the thermal treatment for crystallization was identified to be carbonate apatite; (2) the addition of fluorine was very effective because it acted as a nucleating agent for the crystallization; and (3) the mechanical strength of the glass-ceramic obtained could be enhanced by the replacement of sodium ions present at the surface layer by the treatment in a molten potassium salt, i.e., by an ion exchange treatment.

When alkaline oxides are not contained in the above-described compositions in substantial amounts, it is thought that influences upon blood in living bodies is neglibly small.

Alumino phosphate glasses comprising a $P_2O_5$-$B_2O_3$-$Al_2O_3$-$M^{2+}O$ (wherein M is Mg or Ca) system, which are suitably used for forming the inner tubes of sodium discharge lamps because of their small coefficients of thermal expansion, are described in A. E. Dale & J. E. Stanworth, *Journal of Society of Glass Technology*, Volume 35, pages 185–192 (1951). The content ranges of the oxides constituting the above-described glass compositions are as follows: $P_2O_5$ is from about 15 to 31 wt%; $B_2O_3$ is from about 14 to 44 wt%, $Al_2O_3$ is from about 15 to 28 wt%, MgO is from about 11 to 17 wt%, CaO is from about 0 to 6 wt%; and, additionally, $SiO_2$, which is introduced into the glass compositions as a contaminant through the corrosion of refractory used in the melting process is about 7 wt% or less. Since these alumino phosphate glasses retain a linear coefficient of thermal expansion at a low level of about $50 \times 10^{-7}$ cm/cm°C. or so, they are employable for sealing leading wires made of an alloy of Fe-Ni-Co system, and as the inner layer of a boro silicate glass. These glasses are characterized by high contents of $B_2O_3$ and MgO, while the CaO content is relatively low.

In another aspect of the prior art, fundamental studies of bone china have been undertaken. P. D. S. St. Pierre investigated the phase diagram of the three-component system of $Ca_3(PO_4)_2$-$Al_2O_3$-$SiO_2$ at high temperatures, and reported the results of investigations in *Journal of American Ceramics Society*, Volume 37 (6), pages 243–253 (1954). Therein, glass pieces were obtained by charging a glass batch in an amount corresponding to 4 g of glass in a 10 ml of platinum crucible and then, by melting the glass batch at 1700° C. for 20–30 minutes and next, by cooling the molten glass rapidly in water and further repeating the melting-rapid cooling procedure three times. The refractive indexes of the thus-obtained glasses were measured by the immersion method using a petrographic microscope, and the isofract diagram of the aforesaid three-component system was illustrated in a form of triangular composition diagram. On the basis of the investigation, St. Pierre reported that transparent and homogeneous glasses in the central part of the phase diagram of the three-component system were difficult to make because of their markedly high viscosities, as can be seen from the above-described procedures, and, furthermore, in both the high content range of $SiO_2$ and $Al_2O_3$, the vitrification of the system is nearly impossible, particularly using a platinum crucible. In addition, crystal species separated out of the solid-liquid phase boundary and the liquid phase of the pseudo three-component system of the above-described type (that is, the four-oxide component system of St. Pierre), as is summarized on the triangular composition diagram. As the summary shows, the liquidus temperatures are generally high and that the viscosities are also high. Therefore, it is difficult using such a system to make glass on the industrial scale.

In recent years, the advantages of ceramics and glasses or glass-ceramic materials have become appreciated as biological implanting materials, in the place of conventionally used plastic and metallic materials. Under these circumstances, studies of these materials have been made not only with the intention of solving the problems that the conventionally used implanting materials are sometimes toxic to or rejected by human bodies, but also with the positive intention of developing novel materials having such a biological replacing reactivity that they may adhere completely to some substances as implanting elements and that, after some definite period of time they may be replaced by living bones not only at the adhesion surfaces but also over the inner parts thereof.

Hydroxy apatite is supposed to be an inorganic material formed from the bones of formerly living bodies and contains calcium phosphate as a main component. Accordingly, calcium orthophosphate or hydroxy apatite powder has been used as a starting material for making implanting ceramic materials and it has been usually subjected to, in sequence, a pressure molding treatment and a sintering treatment (or the like) in order to make ceramic materials. In such a process, various attempts have been made to enhance the mechanical strength and to improve general physical properties such as pore characteristics, and what sorts of additives, what pressure applying means and what sintering conditions were preferable for the above-described purposes have been reported.

However, it appears that insofar as the method of making ceramic materials is based upon the powder sintering method, there is a limit to the physical and chemical homogeneity of the ceramic materials made. Microscopic homogeneity of the structure is, nevertheless, a very important essential item to an implanting material, as well as the macroscopic mechanical strength thereof. Further, these characteristics must be controlled adequately in the process of making the implanting material. Although various bioglasses and glass-ceramics have been proposed as materials capable of realizing the above-described aims, the compositions of those which are reported in the above-described, Japanese Patent Application (OPI) No. 73019/76 and Japanese Patent Publication 8970/76 have small contents of calcium phosphate, which is supposed to facilitate the biological replacement properties, or the glasses made from such compositions are chemically unstable. Therefore, glass-ceramics cannot be made from these compositions on a large scale.

SUMMARY OF THE INVENTION

A main object of the present invention is, therefore, to provide glass compositions which have relatively high contents of calcium phosphates and that are vitrified at relatively low melting temperatures.

The above-described object is attained with a novel system of compositions in which three glass network-forming oxides, viz., $P_2O_5$, $SiO_2$, and $B_2O_3$, and a relatively large amount of alumina ($Al_2O_3$) are contained. In addition, by the use of this novel system and through a thermal treatment controlled under particular conditions, glass-ceramic materials whose main crystalline phase comprises crystals of the calcium phosphate series, which separate out through the thermal treatment, can be made.

Specifically, glass compositions (also referred to herein as "glasses") according to the present invention comprise (by weight) from 8 to 35% $P_2O_5$, from 8 to 48% $SiO_2$ and $GeO_2$, provided that the $GeO_2$ content is not more than 6 wt%, from 3 to 18% $B_2O_3$, from 16 to 28% $Al_2O_3$, and from 3 to 33% CaO, MgO, SrO and BaO, provided that the sum of the MgO, SrO, and BaO contents is not more than 15%, and further wherein the sum of the above-described oxides comprises at least 88% of the total composition and the ratio of the sum of the CaO, MgO, SrO and BaO contents to the $P_2O_5$ content ranges from 0.6/1 to 1.4/1.

DETAILED DESCRIPTION OF THE INVENTION

When a ratio of the sum of contents of CaO, MgO, SrO and BaO to the $P_2O_5$ content is less than about 0.6/1, the glass composition does not vitrify. On the other hand, when the ratio is more than about 1.4/1, the glass composition undergoes phase separation, and cannot be transformed into transparent glass, but rather presents the appearance similar to solid paraffin.

When the $P_2O_5$ content is lower than about 8% (the percentage referred to herein refer to percentages by weight (i.e., wt%)) the composition becomes highly viscous (about $10^5$ poises or more) at a high temperature (at about 1500° C.), and consequently the vitrification of the composition becomes difficult. On the other hand, when a $P_2O_5$ content is higher than about 35% the glass composition causes phase separation, and a milky white appearance.

When the sum of the $SiO_2$ and $GeO_2$ contents is lower than about 8%, the glass composition becomes milky white. On the other hand, when the sum of these contents is higher than about 48% the composition becomes highly viscous at high temperatures and consequently, it is difficult for the composition to vitrify. The adverse effect of including more than 6 wt% $GeO_2$ is that devitrification occurs in the production of glass ceramics.

When the $Al_2O_3$ content is lower than about 16%, the glass composition presents an inhomogeneously opacified appearance. On the other hand, when an $Al_2O_3$ content is higher than about 28%, the glass composition is relatively homogeneously opacified and at the same time, it tends to markedly increase the viscosity to render the vitrification thereof difficult.

When the $B_2O_3$ content is lower than about 3%, the glass composition undergoes phase separation at high temperatures generating haze and turning the composition milk-white. On the other hand, when the $B_2O_3$ content is higher than about 18%, although a decrease in viscosity is observed in the composition, the composition opacifies rapidly in the course of casting. Therefore, it becomes impossible to make transparent glass from such a composition.

When the sum of contents of alkaline earth metal oxides such as CaO, etc., is higher than about 33%, the glass composition undergoes phase separation to opacify in analogy with the case of $P_2O_5$ and further, causes surface devitrification. On the other hand, when the sum is lower than about 8%, the composition becomes highly viscous, and therefore the vitrification becomes difficult.

Of these alkaline earth metal oxides, MgO exerts particularly desirable effects upon the resulting glass composition. For instance, the addition of MgO can expand the vitrifying region, can lower the viscosity, and can increase the indentation hardness. On the other hand, both BaO and SrO exhibit less beneficial effects than MgO, viz., they exhibit only the viscosity-decreasing effect. Under these circumstances, the preferable sum of the MgO, SrO and BaO contents is not more than 15%. Coefficient of thermal expansion reduces by using MgO instead of SrO and BaO.

In addition, $TiO_2$ and $ZrO_2$ can be present in amounts up to 12% and 6%, respectively. These oxides act effectively as nucleating agents upon crystallization. Preferred maximum concentrations of $TiO_2$ and $ZrO_2$ are about 5% and about 3%, respectively, while they depend on a basic material for glass composition. When the $TiO_2$ content is higher than about 12% or the $ZrO_2$ content is higher than about 6%, the oxide does not solubilize in the resulting composition and separates out even at very high temperatures. Namely, they lose compatibility with the other components of this system. Not only these oxides, but also metals such as platinum, gold, silver, etc., or other oxides such as cerium oxide, etc., can be used as nucleating agents. In addition, the latter nucleating agents have coloring effects.

Even when gold and silver are contained as nucleating agents up to 0.02% and 0.1%, respectively, the metal can be soluted in the resulting composition without any coloration.

When cerium oxide is contained in a proportion of 3% or more, an opacified glass is produced. On the other hand, when the content of cerium oxide is lower than 3%, for example, 1%, golden yellow glass can be made in the presence of 2% $TiO_2$. This glass is transformed into desirable ivory-colored glass ceramics by crystallization.

When platinum is added in a form of chloroplatinic acid in a proportion of 0.01% or 0.001%, platinum colloid separates out and a blackish-gray or gray glass is obtained. Though such a glass is translucent, it can be transformed into a gray glass-ceramic material by the thermal treatment producing crystallization.

Into the glass composition system of the present invention, alkali metal oxides may be present if the sum of their contents is less than 1%. When the sum exceeds 1%, the resulting glass composition becomes milky white glass. Although it is possible to vitrify calcium pyrophosphate glasses to which each $Na_2O$ and $K_2O$ are added in proportions of 0.5 wt%, respectively, the Tyndall phenomenon is observed in the glass obtained when the glass is heated to 900° C. in a re-heating treatment, and upon further heating up to 1,000° C. the glass is soften and deformed. Therefore, such compositions are unsuitable for the purpose of making glass-ceramics.

In addition, the influence of fluorides upon the glass compositions of the present invention have been examined. For example, in case that 1.8% of fluorine is contained in a form of calcium fluoride, the glass compositions can be vitrified at high temperatures, but they have a marked tendency to undergo a devitrification phenomonen and hardening of the glass occurs in the casting process.

Further, influences of ZnO upon the glass compositions of the present invention have also been examined. The addition of ZnO in a proportion of about 10% causes a cast glass block to opacify in the central part thereof and not to be vitrified therein. On the other hand, if the addition of ZnO is reduced to 5% or less, the vitrification of the resulting composition becomes possible. However, the compatibility of ZnO is not as good as that of the oxides of alkaline earth metals belonging to subgroup A, such as CaO, MgO, etc.

Rare earth oxides are compatible therein in small amounts. About 5% addition of $La_2O_3$ results in surface devitrification and opacifies the resulting glass. On the other hand, $Y_2O_3$ induces similar results to those of $La_2O_3$ when added in a proportion of about 3%.

The addition of $As_2O_3$ or $Sb_2O_3$ as a refining agent is, of course, possible in the present invention also, so far as it is not undesirable with respect to the end-use purposes of glass composition or glass-ceramics made therefrom. Addition amounts of such oxides are generally about 2% or less. In the event that glass compositions and glass-ceramics made therefrom are made for the purpose of biological uses, it is undesirable for them to contain $As_2O_3$, CdO, HgO, heavy metals and radioactive elements, etc., which are supposed to be toxic to human bodies.

To the glass compositions of the present invention usually employed various kinds of coloring agents and dopants which provide emission of fluorescence can be added within the scope of the present invention, that is, up to 12%.

As starting materials for making glasses, not only oxides themselves but also substances which can be converted into the desired oxides by thermal decomposition, and that are relatively stable when allowed to stand in contact with the atmosphere, that is to say, stoichiometrically stable in the atmosphere, and specifically not or only slightly hygroscopic, etc., such as carbonates, nitrates, hydroxides, etc., can be employed.

The glass compositions of the present invention can be obtained by melting such above-described compositions and then cooling them in a conventional manner.

These glasses can be crystallized by conventional thermal treatments for crystallization when the glass compositions formed comprise specific proportions of oxides as are described herein. Namely, a glass-ceramic product according to the invention can be obtained using a glass composition comprising from 8 to 35 wt% $P_2O_5$, from 8 to 38 wt% $SiO_2$ and $GeO_2$, provided that the $GeO_2$ content is not more than 6 wt%, from 3 to 10 wt% $B_2O_3$, from 16 to 28 wt% $Al_2O_3$, and from 8 to 33% CaO, MgO, SrO and BaO, provided that the sum of the MgO, SrO and BaO contents is not more than 15 wt%, and wherein the sum of the contents of the above-described oxides is at least 88 wt% of the total composition of said glass, and the ratio of the sum of the CaO, MgO, SrO and BaO contents to the $P_2O_5$ content is within the range of from 0.6/1 to 1.4/1. The process includes the steps, in sequence, of (1) melting such a glass composition as described above, (2) molding the melted glass composition, (3) cooling the molded composition to its transformation temperature or less, and (4) re-heating the molded composition under conditions such that the shape of the molded composition is retained and unaltered, thus allowing phosphate crystals to separate out as the main crystal phase.

EXAMPLE

Glasses having compositions as set forth in Table 1 were made using the conventional melting method. Namely, powdery starting materials corresponding to the oxides desired to be contained in the intended composition were weighed accurately, and then were mixed together homogeneously. The thus prepared glass batch was charged into a platinum lined crucible which had been pre-heated to about 1,450° C. After the charging was over, the mixture was stirred, refined and homogenized. The resulting glass melt was cast in a pre-heated mold. After cooling slowly, the glass formed was taken out of the mold at room temperature.

When a portion of about 1 kg of glass batch was made to melt with a platinum lining crucible having an effective volume of about 300 ml, it took about 40 minutes to 1 hour and a half to charge all of the starting materials, and it took from 4 to 8 hours to complete stirring and refining. (Theoretical weight of glass in oxide base is 100% when all materials for glass composition are oxides without the loss of vapor by thermal decomposition.)

The casting was carried out generally at a temperature equal to or lower than the refining temperature. The casting temperature was determined depending upon the viscosity of glass melt to be cast and the melting scale thereof. On the 1 kg scale of this example, the casting was carried out at about 1,300° C. to 1,420° C.

After the above-described glass melt was maintained at its transformation temperature for about one hour, it was cooled slowly with a cooling rate of 30° C./hour to obtain transparent glass block. (The transformation temperature is measured by a fiber elongation method, and is the temperature corresponding to the point at which thermal expansion of a glass bar abruptly increases when temperature of the glass bar increases at a certain rate.)

In this example, silica powder passed through an 80 mesh sieve was used as the main starting material for $SiO_2$. Aluminum hydroxide powder was used as the starting material for $Al_2O_3$, and as the starting material for phosphate calcium orthophosphate, calcium pyrophosphate, aluminium metaphosphate powder, hydroxy apatite powder or the like was used. As starting materials for the alkaline earth metal oxides, oxides such as CaO, MgO and the like, or their respective carbonate powders, were used.

The physical properties of the thus-obtained glasses were examined. The physical properties determined in this example include specific gravity, average linear coefficient of thermal expansion which is determined by heating glass from 100° C. up to 300° C. with a heating rate of 5° C./minute and measuring the rate of thermal expansion of the glass using a dilatometer at each prescribed temperature, transformation temperature, deformation temperature and Knoop hardness determined under the condition that load was 100 g and loading time was 15 seconds. The results obtained are summarized in Table 1.

As can be seen from Table 1, the glasses of the present invention are generally characterized by a specific gravity ranging from about 2.5 to about 2.9, a dilatometric transformation temperature ranging from about 450° C. to about 750° C., and an average linear coefficient of thermal expansion (in the temperature range of 100° C. to 300° C.) ranging from about $40 \times 10^{-7}$ to about $90 \times 10^{-7}$ cm/cm°C. Further, the glasses of the present invention were found to have the unique combination of properties that while the melting temperature is 1,500° C. or lower the transformation temperature is relatively high and the coefficient of thermal expansion is low.

It is possible to have a $Ca_3(PO_4)_2$ content, in view of composition, of up to about 60% in the glass compositions of the present invention.

The glasses of the present invention were colorless and transparent when they did not contain $TiO_2$, but they turned brown when $TiO_2$ was contained therein. The density of the brown color increased with the content of $TiO_2$. When both $CeO_2$ and $TiO_2$ were included, the glass was golden yellow in color.

The composition of the glasses as used in this Example are set forth in Table A (mole %) and Table 1 (weight %).

TABLE A (mole %)

| Component | Glass Sample No. | | | | | | | | | | |
|---|---|---|---|---|---|---|---|---|---|---|---|
| | 1 | 2 | 3 | 4 | 5 | 6 | 7 | 8 | 9 | 10 | 11 |
| $P_2O_5$ | 5.2 | 5.5 | 7.8 | 9.9 | 12.4 | 7.0 | 11.1 | 13.7 | 13.1 | 12.4 | 14.4 |
| $SiO_2$ | 48.4 | 56.5 | 49.2 | 33.9 | 16.0 | 44.7 | 28.6 | 17.7 | 24.5 | 23.2 | 18.6 |
| $B_2O_3$ | 9.3 | 4.9 | 4.9 | 4.9 | 18.5 | 9.0 | 4.9 | 10.2 | 5.3 | 5.0 | 5.4 |
| $Al_2O_3$ | 19.0 | 16.7 | 14.8 | 16.6 | 15.8 | 13.5 | 16.9 | 17.3 | 18.0 | 17.1 | 18.3 |
| CaO | 15.7 | 16.4 | 23.3 | 29.6 | 37.3 | 21.1 | 33.3 | 41.1 | 39.1 | 37.1 | 43.3 |
| MgO | | | | | | | | | | | |
| SnO | | | | | | | | | | | |
| $GeO_2$ | | | | | | | | | | | |
| $TiO_2$ | 2.4 | | | 5.1 | | 4.7 | 5.2 | | | 5.2 | |
| $ZrO_2$ | | | | | | | | | | | |
| Sum Total | 100.0 | 100.0 | 100.0 | 100.0 | 100.0 | 100.0 | 100.0 | 100.0 | 100.0 | 100.0 | 100.0 |

| Component | Glass Sample No. | | | | | | | | | |
|---|---|---|---|---|---|---|---|---|---|---|
| | 12 | 13 | 14 | 15 | 16 | 17 | 18 | 19 | 20 | 21 |
| $P_2O_5$ | 14.2 | 14.2 | 14.0 | 14.3 | 13.0 | 19.3 | 20.5 | 14.1 | 15.9 | 14.6 |
| $SiO_2$ | 18.3 | 18.4 | 18.0 | 18.4 | 16.8 | 12.5 | 13.3 | 14.1 | 17.5 | 18.8 |
| $B_2O_3$ | 5.2 | 5.3 | 5.2 | 5.3 | 4.8 | 5.4 | 5.7 | 5.2 | 5.0 | 5.4 |
| $Al_2O_3$ | 17.9 | 18.1 | 17.7 | 13.7 | 16.4 | 18.5 | 19.6 | 17.8 | 13.8 | 18.5 |
| CaO | 42.4 | 42.7 | 41.9 | 42.8 | 38.9 | 38.6 | 40.9 | 42.1 | 23.8 | 29.2 |
| MgO | | | | | | | | | 24.0 | |
| SnO | | | | | | | | | | 7.9 |
| $GeO_2$ | | | | | | | | 4.0 | | |
| $TiO_2$ | 2.0 | | 1.9 | 5.5 | 10.1 | 5.7 | | 2.7 | | 5.6 |
| $ZrO_2$ | | 1.3 | 1.3 | | | | | | | |
| Sum Total | 100.0 | 100.0 | 100.0 | 100.0 | 100.0 | 100.0 | 100.0 | 100.0 | 100.0 | 100.0 |

TABLE 1

| Component (wt. %) | Glass Sample No. | | | | | | |
|---|---|---|---|---|---|---|---|
| | 1 | 2 | 3 | 4 | 5 | 6 | 7 |
| $P_2O_5$ | 10.1 | 10.9 | 15.3 | 18.6 | 22.8 | 13.8 | 20.6 |
| $SiO_2$ | 39.8 | 47.6 | 41.0 | 27.0 | 12.5 | 37.1 | 22.5 |
| $B_2O_3$ | 8.9 | 4.8 | 4.8 | 4.5 | 16.7 | 8.6 | 4.5 |
| $Al_2O_3$ | 26.6 | 23.8 | 21.0 | 22.5 | 20.8 | 19.0 | 22.5 |
| CaO | 12.0 | 12.9 | 18.1 | 22.0 | 27.1 | 16.4 | 24.4 |
| MgO | | | | | | | |
| SrO | | | | | | | |
| $GeO_2$ | | | | | | | |
| $TiO_2$ | 2.7 | | | 5.4 | | 5.2 | 5.4 |
| $ZrO_2$ | | | | | | | |
| Sum Total | 100.1 | 100.0 | 100.2 | 100.0 | 99.9 | 100.1 | 99.9 |
| Specific Gravity | 2.511 | 2.484 | 2.594 | 2.721 | 2.678 | 2.584 | 2.749 |
| Transformation Temperature (°C.) | 725 | | 738 | 705 | | | 699 |
| Deformation Temperature (°C.) | 784 | | 792 | 751 | | | 750 |
| Coefficient of Thermal Expansion ($\times 10^7$ cm/cm °C.) | 40 | | 57 | 61 | | | 69 |
| Knoop Hardness (kg/mm$^2$) | 501 | | | 520 | | | 537 |

| Component (wt. %) | 8 | 9 | 10 | 11 | 12 | 13 | 14 |
|---|---|---|---|---|---|---|---|
| $P_2O_5$ | 25.0 | 24.0 | 22.7 | 26.2 | 25.6 | 25.6 | 25.1 |
| $SiO_2$ | 13.6 | 19.0 | 18.0 | 14.3 | 13.7 | 14.0 | 13.7 |
| $B_2O_3$ | 9.1 | 4.8 | 4.5 | 4.8 | 4.7 | 4.7 | 4.6 |
| $Al_2O_3$ | 22.7 | 23.8 | 22.5 | 23.8 | 23.3 | 23.3 | 22.9 |
| CaO | 29.6 | 28.4 | 26.9 | 31.0 | 30.4 | 30.4 | 29.8 |
| MgO | | | | | | | |
| SrO | | | | | | | |
| $GeO_2$ | | | | | | | |
| $TiO_2$ | | | 5.4 | | 2.0 | | 2.0 |
| $ZrO_2$ | | | | | | 2.0 | 2.0 |
| Sum Total | 100.0 | 100.0 | 100.0 | 100.0 | 100.0 | 100.0 | 100.0 |
| Specific Gravity | 2.750 | 2.755 | 2.794 | 2.781 | 2.811 | 2.823 | 2.844 |
| Transformation Temperature (°C.) | 682 | 717 | 700 | 704 | 713 | | 720 |
| Deformation Temperature (°C.) | 720 | 762 | 743 | 753 | 757 | | 759 |
| Coefficient of Thermal Expansion ($\times 10^7$ cm/cm °C.) | 77 | 75 | 71 | 76 | 78 | | 77 |
| Knoop Hardness (Kg/mm$^2$) | | 510 | 525 | 501 | 525 | 517 | 523 |

| Component (wt. %) | 15 | 16 | 17 | 18 | 19 | 20 | 21 |
|---|---|---|---|---|---|---|---|
| $P_2O_5$ | 26.2 | 23.5 | 32.7 | 34.6 | 24.9 | 30.7 | 24.7 |
| $SiO_2$ | 14.3 | 12.8 | 9.0 | 9.5 | 10.6 | 14.3 | 13.5 |
| $B_2O_3$ | 4.8 | 4.3 | 4.5 | 4.8 | 4.5 | 4.8 | 4.5 |
| $Al_2O_3$ | 18.1 | 21.4 | 22.5 | 23.8 | 22.6 | 19.0 | 22.5 |

TABLE 1-continued

| | Glass Sample No. | | | | | | |
|---|---|---|---|---|---|---|---|
| CaO | 31.0 | 27.8 | 25.8 | 27.3 | 29.5 | 18.1 | 19.5 |
| MgO | | | | | | 13.1 | |
| SrO | | | | | | | 9.8 |
| $GeO_2$ | | | | | 5.2 | | |
| $TiO_2$ | 5.7 | 10.3 | 5.4 | | 2.7 | | 5.4 |
| $ZrO_2$ | | | | | | | |
| Sum Total | 99.9 | 100.1 | 100.0 | 100.0 | 100.0 | 100.0 | 99.9 |
| Specific Gravity | 2.829 | 2.875 | 2.744 | 2.691 | 2.880 | 2.773 | 2.874 |
| Transformation Temperature (°C.) | 685 | 692 | 625 | | | 647 | 645 |
| Deformation Temperature (°C.) | 729 | 730 | 664 | | | 716 | 683 |
| Coefficient of Thermal Expansion ($\times 10^7$ cm/cm °C.) | 82 | 79 | 86 | | | 71 | 81 |
| Knoop Hardness (kg/mm$^2$) | 505 | 547 | 475 | | | 535 | 511 |

Next, the glasses of the present invention were examined for their chemical durabilities by the powder method. Specifically, crushed pieces of glass having a grain size of from 420 to 590μ were charged in a platinum mesh basket in an amount corresponding to its specific weight (g/ml), the basket was soaked in a processing liquid placed in a quartz flask equipped with a condenser and after one-hour's processing in the boiled processing liquid, the reduction in the glass weight was measured. Therein, the chemical durability was evaluated by such a weight loss, and expressed in terms of 100 times the weight loss divided by the specific weight (%). As the processing liquid, distilled water was used when it was desired to test the aqueous solubility, while 0.01 N nitric acid solution was used when it was desired to test the acid solubility. The results of measurements are shown in Table 2. Therein, the results of the measurements with respect to optical borosilicate glass [$n_d$=1.5163, $v_d$ (Abbe' number)=64.0, specific gravity=2.53] are also listed for the purpose of comparison. The glasses of the present invention have much higher water resistance than that of the borosilicate glass, but the acid resistance of the glasses of the present invention is nearly equal to that of the borosilicate glass.

TABLE 2

| | [weight loss (%)] | | |
|---|---|---|---|
| Glass Sample No. | No. 14 | No. 10 | Borosilicate Glass |
| Processing Solution | | | |
| Distilled Water | 0.014 | 0.025 | 0.111 |
| Nitric Acid Solution | 0.134 | 0.128 | 0.095 |

Figure 1:
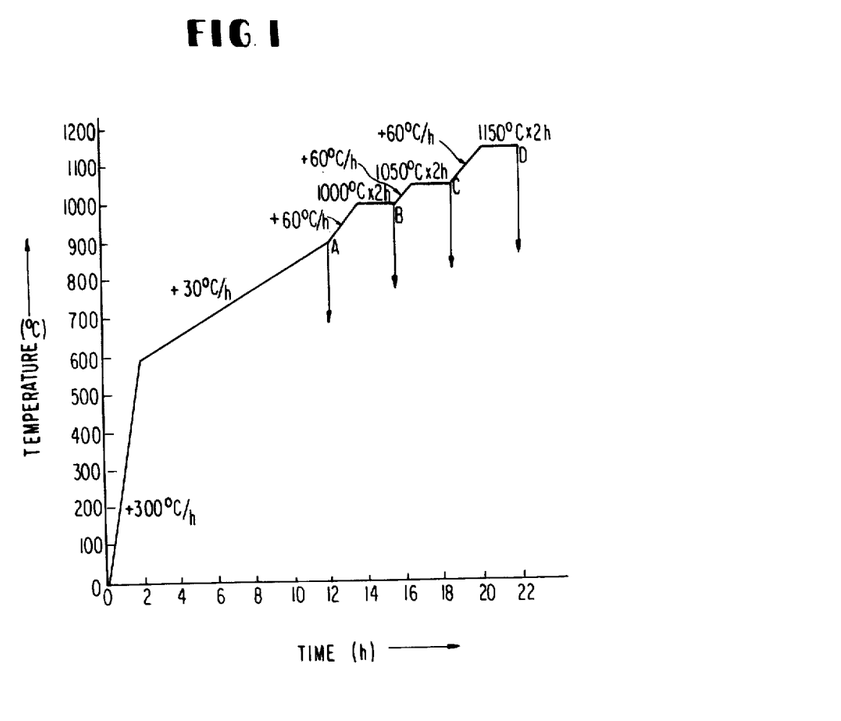
FIG. 1 illustrates an example of heating conditions for thermal treatments in a series of steps which are carried out for the purpose of examining the tendency of the glass composition of the present invention to crystallize and be transformed into a glass-ceramic material.

Next, in order to investigate the crystallization characteristics of glasses set forth in Table 1, the glasses were subjected to thermal treatments under such conditions as illustrated in FIG. 1. Specifically, each of the glass compositions was heated with a slow rate of 30° C./hour in the temperature range of 600° C. to 900° C., which covers all the transformation range of the glasses. In the temperature range beyond 900° C., the glass composition was heated with a temperature-raising rate of 60° C./hour, but at 1,000° C., 1,050° C. and 1,150° C., respectively, the glass composition was maintained at that temperature for two hours. Each of the glass compositions was taken out of the furnace when the heating condition was reached to B, C or D point, and quenched rapidly.

Samples No. 1 to No. 5 were deformed or melted before the conversion into a glass-ceramic was to take place, and therefore, these compositions were unsuitable for the purpose of making glass-ceramics. This indicates that these compositions belong to the range in which very stable glasses are obtained.

It is not possible to illustrate graphically the five-component composition system of the present invention. However, it can be said that in the range where a $SiO_2$ content and/or a $B_2O_3$ content are/is high the composition has, in general, a tendency to be deformed before the crystallization takes place.

Accordingly, the glass compositions capable of being converted into glass-ceramics were the glass samples No. 6 to No. 21. As to opal or white glass-ceramics which were obtained by cooling their respective glasses heated up to their respective maximum temperatures corresponding to the point B, the point C or the point D in FIG. 1 rapidly to a room temperature, the specific gravities thereof and the crystal species identified by the X-ray diffraction method are summarized in Table 3 together with their respective maximum temperature for crystallization.

In addition, the specific gravities of glass-ceramics crystallized at the point A, the point B, the point C and the point D, respectively, were measured and the specific volume change (%), on the basis of the specific gravity of the parent glass thereof prior to the thermal treatment for crystallization was determined. Such data are also listed in Table 3.

Further, with respect to the glass samples No. 10, No. 12, No. 13, No. 18 and No. 21, transformation temperatures of their respective glass-ceramics, deformation temperatures thereof and average linear coefficients of thermal expansion thereof, which each were determined in the same manner as in the case of glasses, are set forth in Table 3, together with their respective maximum crystallization temperatures.

TABLE 3

| | Glass Sample No. | | | | | |
|---|---|---|---|---|---|---|
| | 6 | 7 | 8 | 9 | 10 | 11 |
| Maximum Crystallization Temp. (°C.) | 1050 | 1050 | 1050 | 1050 | 1050 | 1050 |
| Specific Gravity | 2.581 | 2.847 | 2.771 | 2.784 | 2.902 | 2.868 |
| Crystal Species | β-$C_3P$ rutile | β-$C_3P$ rutile | β-$C_3P$ | β-$C_3P$ | β-$C_3P$ rutile | β-$C_3P$ mullite |
| Specific Volume Change (%) Maximum Temp. on Crystallizing Treatment | | | | | | |
| 900° C. | −0.96 | +0.15 | −0.40 | −0.65 | 0 | −0.78 |

TABLE 3-continued

| | | | | | | |
|---|---|---|---|---|---|---|
| 1000° C. | — | −0.83 | — | — | −3.85 | — |
| 1050° C. | +0.12 | −3.14 | −0.76 | −1.04 | −3.20 | −3.03 |
| 1150° C. | — | — | — | — | −3.34 | — |
| Maximum Crystallizing Temp. (°C.) | | | | | 1050 | |
| Transformation Temp. (°C.) | | | | | 730 | |
| Deformation Temp. (°C.) | | | | | >800 | |
| Average Linear Coefficient of Thermal Expansion (× 10⁷ cm/cm °C.) | | | | | 83 | |

| | Glass Sample No. | | | | |
|---|---|---|---|---|---|
| | 12 | 13 | 14 | 15 | 16 |
| Maximum Crystallization Temp. (°C.) | 1050 | 1050 | 1050 | 1050 | 1050 |
| Specific Gravity | 2.903 | 2.928 | 2.932 | 2.921 | 3.008 |
| Crystal Species | β-C₃P mullite | β-C₃P mullite | β-C₃P | β-C₃P rutile | β-C₃P rutile |
| Specific Volume Change (%) Maximum Temp. on Crystallizing Treatment | | | | | |
| 900° C. | −0.81 | −1.02 | −0.84 | −1.53 | −3.36 |
| 1000° C. | −2.57 | −1.12 | −2.57 | −3.02 | −4.49 |
| 1050° C. | −3.17 | −3.59 | −3.00 | −3.15 | −4.42 |
| 1150° C. | — | −3.56 | — | −2.41 | −4.45 |
| Maximum Crystallizing Temp. (°C.) | 1050 | 1050 | | | |
| Transformation Temp. (°C.) | 731 | 725 | | | |
| Deformation Temp. (°C.) | >800 | >800 | | | |
| Average Linear Coefficient of Thermal Expansion (× 10⁷ cm/cm °C.) | 88 | 84 | | | |

| | Glass Sample No. | | | | |
|---|---|---|---|---|---|
| | 17 | 18 | 19 | 20 | 21 |
| Maximum Crystallization Temp. (°C.) | 1050 | 1000 | 1050 | 1050 | 1000 |
| Specific Gravity | 2.734 | 2.682 | 3.000 | 2.838 | 2.957 |
| Crystal Species | β-C₃P β-Cri rutile | β-C₃P β-Cri mullite | β-C₃P mullite | C₃Mg₃P₂ 9Al₂O₃.2B₂O₃ | β-C₃P rutile mullite |
| Specific Volume Change (%) Maximum Temp. on Crystallizing Treatment | | | | | |
| 900° C. | +0.55 | +0.67 | −0.76 | −1.21 | −1.95 |
| 1000° C. | +0.15 | −0.35 | −3.74 | −2.15 | −2.81 |
| 1050° C. | +0.37 | +0.34 | −4.00 | −2.29 | −2.58 |
| 1150° C. | deformed | deformed | −2.34 | melt | — |
| Maximum Crystallizing Temp. (°C.) | | 1000 | | 1000 | 1000 |
| Transformation Temp. (°C.) | | 545 | | 545 | 636 |
| Deformation Temp. (°C.) | | >800 | | >800 | >800 |
| Average Linear Coefficient of Thermal Expansion (× 10⁷ cm/cm °C.) | | 138 | | 138 | 87 |

Figure 2:
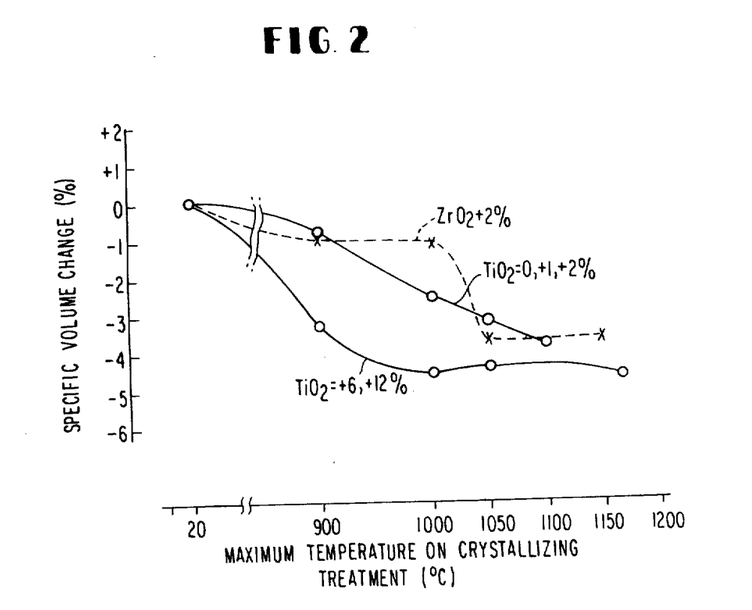
FIG. 2 shows specific volume changes of glass-ceramics based on their respective parent glass compositions, which changes are caused as the result of transformations of the parent glasses into their respective glass-ceramics. The glass compositions represented in FIG. 2 contained all the components of Sample No. 11, set forth in Table 1, and additionally contained as nucleating agents, different amounts of $TiO_2$ or $ZrO_2$, respectively, are employed as parent glasses, and the transformations are tried under each heating conditions for the thermal treatments illustrated in FIG. 1.

Note:
C₃Mg₃P₂: Ca₃Mg₃(PO₄)₄
β-C₃P: β-Calcium Orthophosphate
β-Cri: β-Cristobalite The relationship of the change in the rate of the specific volume with respect to the maximum temperature for the crystallizing treatment was examined, and is depicted by a curve for the case of the glass sample No. 11, wherein the TiO₂ content was zero and further, for the cases wherein TiO₂ was added to the glass composition corresponding to the glass sample No. 11 in proportions of about 1% and 2%, respectively, which each could be crystallized by the above-described thermal treatment. The curves obtained were almost the same as one another. Furthermore, in each of samples where the TiO₂ contents were increased up to about 6% and 12%, respectively, it was confirmed that the change rate of the specific volume decreased sharply before the temperature for crystallizing treatment reached 900° C., and had a minimum value at the point of 1,000° C., as illustrated in FIG. 2. These facts indicate that the action of TiO₂ as a nucleating agent becomes remarkably effective only when the TiO₂ content exceeds some specific value, which differs depending on the particular components that constitute the glass.

Therein, brownish tint of the parent glass and that of its glass-ceramic increased with the TiO₂ content.

On the other hand, the glass was not colored by the addition of ZrO₂, and pure-white glass-ceramics were obtained. As illustrated in FIG. 2, in the case of the ZrO₂ addition, the change in the specific volume was shown by a curve differing from those of the TiO₂ additions. Specifically, a slight contraction in the specific volume was observed in the range below 1,000° C., and a sharp decrease in the specific volume occurred between 1,000° C. and 1,050° C.

The relation between the glass composition and the crystal species separated by the treatment for crystallization was complex and therefore, could not be described sweepingly. However, there were the following tendencies: In the glass compositions of the calcium orthophosphate system, when a nucleating agent was not contained or was contained in a small proportion, β-calcium phosphate alone or both β-calcium phosphate and mullite separated. On the other hand, when TiO₂ was contained in a relatively large proportion, specifically about 5% or more, mullite did not separate but crystallites or rutile did separate. In the glass compositions of the calcium pyrophosphate system, such as sample Nos. 17 and 18, the change in the specific volume was slight and the original volume was essentially maintained, indicating the β-calcium phosphate and β-cristobalite were produced. Upon the addition of a nucleating agent, mullite did not separate but crystallites of rutile did separate. Crystal species in the cases of glass compositions containing $GeO_2$ were almost the same as those in the cases of glass compositions containing $SiO_2$. In the cases of glass compositions containing SrO, three kinds of crystal species, β-calcium phosphate, rutile and mullite, separated. In the case of the glass composition containing MgO in a proportion of about 13% and that not containing any nucleating agents, that is, sample No. 20, crystal species separated were peculiar, and they were the calcium orthophosphate-magnesium orthophosphate 1:1 (by mole) solid solution crystal and aluminium borate crystal.

The crystal form of the separated β-calcium phosphate was examined by subjecting the fracture surface of the glass-ceramic obtained to the surface treatment with hydrochloric acid, and then observing the resulting fracture surface with a scanning type electron microscope. The grain size was found to be increased with an increase in the temperature for crystallizing treatment. For example, when the glass composition of sample No. 10 was maintained at 1050° C. for 2 hours, crystal grains having an average size of about 0.5 micron separated. In general, there was a tendency for glasses containing nucleating agents in small proportions to separate crystal grains having a small density. The crystal grains had various forms, for example, granular, branchy and intertwined mosaic forms. However, a desired crystal form could be attained by selecting the combination of composition and crystallizing condition.

The thermal characteristics of the glass-ceramics of the present invention were as follows: The transformation temperatures, the deformation temperatures and the linear coefficients of thermal expansion were higher than those of their respective parent glasses. Many of the glass-ceramics had thermal expansion coefficients ranging from about $8 \times 10^7$ to $90 \times 10^{-7}$ cm/cm°C. The thermal expansion curve increased generally in proportion to the rise in temperature till the temperature reached the transformation temperature or the vicinity thereof. In the sample No. 18, however, the glass-ceramic made by keeping its parent glass at the maximum crystallizing temperature of 1,000° C. for 2 hours exhibited abnormal expansion at a temperature of about 170° C., which was supposed to result from β-cristobalite. Therein, the average coefficient of thermal expansion in the temperature range of 100° C. to 800° C. was $131 \times 10^{-7}$ cc/cm°C., while the average coefficient in the temperature range of 100° C. to 170° C. was $214 \times 10^{-7}$ cm/cm°C.

The glasses and their glass-ceramics of the present invention were examined for mechanical properties, that is, modulus of rupture, Young's modulus, shear modulus and Poisson'ratio.

Samples to be employed for determining the abovedescribed moduli were prepared as follows: Each of the parent glasses set forth in Table 4 was divided into two portions and placed in separate furnaces. They were then heated at a rate of +30° C./hour in the temperature range of 600° C. to 900° C., and after the temperature reached 900° C. they were further heated at a rate of +60° C./hour. One portion heated up to 1,000° C. was maintained at 1,000° C. for 2 hours, and then cooled in the furnace to room temperature. The other portion was furthermore heated up to 1,050° C. after a two-hour heating at 1,000° C. and then, maintained at 1,050° C. for 2 hours. Thereafter, it was cooled in the furnace to a room temperature. The thus-obtained glass-ceramic blocks each was taken out of their respective furances, cut into four square columns measuring from 3 to 4 mm per side and 50 mm in length, using a diamond cutter, and then polished using an abrasive of Corundum No. 1000 (trademark of the American Optical Co., U.S.A.). The modulus of rupture of each sample was determined by the three-point loading method using an Autograph manufactured by Shimazu Seisakusho Ltd. Then measurements were carried out under the following conditions; Distance between fulcra was 30 mm, the curvature radius of the lower fulcrum was 2 mm, the curvature radius of the punch was 5 mm, and the loading speed was constant and 0.1 mm/minute. The Young's modulus, the shear modulus and the Poisson's ratio of each sample were measured by the resonance frequency method at an ordinary temperature.

The results of measurements are summarized in Table 4 together with the data of their respective parent glasses shown in Table 1. The average of the coefficients of variation regarding the data of the modulus of rupture was about 7.2%, and the degree of estimate limit of the average modulus of rupture is ±11.4% 95% confidence coefficient.

TABLE 4

| Characteristic | Glass No. | Parent Glass | Glass-Ceramic Material | |
|---|---|---|---|---|
| | | | 1000° C. × 2h | 1050° C. × 2h |
| Modulus of | 10 | 810 | 2010 | 1990 |
| Rupture | 12 | 720 | 1590 | 1690 |
| (kg/cm$^2$) | 13 | 890 | 1780 | 1920 |
| | 14 | 880 | 1920 | 1610 |
| Young's | 10 | 8620 | 11480 | 11370 |
| Modulus | 12 | 8300 | 10730 | 10890 |
| (kg/mm$^2$) | 13 | — | 10370 | 11340 |
| | 14 | 8460 | 10970 | 10850 |
| Shear | 10 | 3350 | 4550 | 4520 |
| Modulus | 12 | 3210 | 4210 | 4280 |
| (kg/mm$^2$) | 13 | — | 4070 | 4420 |
| | 14 | 3290 | 4310 | 4280 |
| Poisson's | 10 | 0.285 | 0.286 | 0.259 |
| Ratio | 12 | 0.295 | 0.274 | 0.273 |
| | 13 | — | 0.275 | 0.284 |
| | 14 | 0.287 | 0.275 | 0.267 |

The modulus of rupture of each parent glass was about 800 kg/cm$^2$, which is somewhat higher than that of plate glass, hard glass or transparent quartz glass, that is, 500-600 kg/cm$^2$, even though the great influence of surface conditions upon the modulus of rupture was taken into account. The Young's modulus of each parent glass was larger than that of Pyrex 7740 (trademark of Corning Glass Works Co.), viz., 6,320 kg/mm$^2$, or that of Pyrex 6080 (also a trademark of the Corning Glass Works Co.), viz., 7,380 kg/mm$^2$, by a factor of from about 1.15 to 1.35.

The moduli of rupture of glass-ceramics depended on the maximum crystallizing temperature. In the compositions containing nucleating agents in small proportions, that is, samples No. 12 and No. 13, the moduli of rupture were higher in the case when the maximum crystallizing temperature was 1050° C. than when said maximum temperature was 1000° C. On the contrary, in the compositions containing nucleating agents in relatively large proportions, that is, samples No. 10 and No. 14, the moduli of rupture saturated in the case that the maximum crystallizing temperature was 1000° C., but the increase in the modulus of rupture resulting from crystallization was great and the moduli of rupture of glass-ceramics came to about 2–3 times those of their respective parent glasses. Similarly, the Young's moduli and the shear moduli of glass-ceramics were higher than those of their parent glasses by about 30%, and the Poisson's ratios decreased as the result of crystallization, that is to say, the Poisson's ratios of glass-ceramics were smaller than those of their respective parent glasses by from about 5 to 10%.

The glass-ceramics of the present invention are illustrated by the above-described example. However, the conditions for the crystallizing treatment are not intended to be construed as being limited to the temperature-time condition employed in the above-described example. The mechanism of crystallization in the component system of the present invention, whether the crystallization results from homogeneous nucleation due to the presence of nucleating agents or liquid-liquid phase separation, is not completely clear. However, the conversion into glass-ceramic materials while the shapes of their respective parent glasses are maintained requires the condition that the glass compositions must be maintained at certain temperatures within the transformation range for specific periods of time, and that the rate of increases of the temperature within the transformation range must be low. The transformation range was dependent on the components and their respective proportions within the range of the compositions of the present invention. Insofar as the glass samples examined in the present example were concerned, the transformation range varied from about 625° C. to 792° C. According to the particular composition, a narrower range may be taken as the transformation range, which is preferable from an economic point of view. For instance, the glass of sample No. 10 of Table 1 which has a transformation temperature of 700° C. was heated at a rate of +300° C./hour up to 720° C., at a rate of +30° C./hour from 720° C. to 810° C., and at a rate of +96° C./hour from 810° C. to 950° C. and then maintained at 950° C. for 2 hours, resulting in the conversion thereof into a white glass-ceramic having a specific gravity of 2.898. In addition, the temperature at which the glass is maintained for the purpose of crystallization and the time spent therefor should be selected depending on the particular composition (as can be seen from FIG. 2), the intended grain size, and the viscosity of the remaining glass matrix portion. In the example described herein, the condition that the glass was maintained at a certain temperature within the range of from about 900° C. to 1150° C. for 2 hours was adopted. However, those skilled in the art will understand that the temperature maintaining condition for crystallization is not necessarily limited to the specific conditions adopted in the example.

In accordance with embodiments of the present invention, then, phosphate glasses and glass-ceramic materials formed therefrom are provided which have novel compositions comprising three kinds of glass network-forming oxides (viz., $P_2O_5$, $SiO_2$, and $B_2O_3$), a large proportion of an intermediate oxide of $Al_2O_3$, and alkaline earth metal oxides, comprising mainly CaO, and which have in higher silica-containing embodiments the special property that they are high-temperature tolerant glasses having high glass transformation temperatures equal to that of Jena Supremax (trademark of Jenaer Glas Work Schott und Gem.) employed for special heat-resisting valves and that can melt at a temperature of 1500° C. or lower without containing any alkali metal oxides. In addition, in high calcium phosphate embodiments, the $Ca_3(PO_4)_2$ content can be increased up to about 60 wt% in the glasses of the present invention, and therefore render them excellent in mechanical strength.

Furthermore, many glass compositions of the present invention, though the range of such compositions is narrower than that for the vitrifible composition, can be easily converted into glass-ceramics by a re-heating treatment, by which $\beta$-calcium phosphates can separate out as a main crystal phase. Further, the modulus of rupture increased by crystallization becomes about 2000 kg/cm$^2$ which is equal to about 2 to 3 times that of parent glass.

Furthermore, by analogy with methods used for conventional glasses, the glass compositions and glass-ceramic materials formed therefrom can be submitted to various kinds of workings in the molding temperature region. They can be molded into the shape of a plate by a press working process or a rolling process, and into a shape of rod or tube by the up drawing process or the down drawing process. It is also feasible to make porous glass-ceramic materials having continuous porosity according to a method which includes the steps of preparing a glass powder having some definite particle size distribution by crushing and sieving a parent glass, softening it as is to a glass state by rapid heating to form a foam glass having a desired shape due to particle-particle bondings, and crystallizing the foam glass by the re-heating treatment.

The glass and glass-ceramic materials of the invention can be used as artificial bones and teeth, biological implanting materials, materials of high thermal shock resistance and high temperature resistance, electrical insulating materials by non-alkaline composition, and so on.

While the invention has been described in detail and with reference to specific embodiments thereof, it will be apparent to one skilled in the art that various changes and modifications can be made therein without departing from the spirit and scope thereof.

What is claimed is:

1. A phosphate glass composition capable of melting at about 1500° C. or lower consisting essentially of from 8 to 35 wt% $P_2O_5$, from 8 to 48 wt% $SiO_2$ and $GeO_2$, provided that the $GeO_2$ content is not more than 6 wt%, from 3 to 18 wt% $B_2O_3$, from 16 to 28 wt% $Al_2O_3$, and from 8 to 33 wt% CaO, MgO, SrO, and BaO, provided that the sum of the MgO, SrO, and BaO contents is not more than 15 wt%, and 0 to 12 wt% of a metal or metal oxide nucleating agent selected from the group consisting of $TiO_2$, $ZrO_2$, $CeO_2$, Au and Ag, and further wherein the ratio of the amount of CaO to the sum of the amount of CaO, MgO, SrO and BaO is more than 58 wt% and the ratio of the sum of the CaO, MgO, SrO and BaO contents to the $P_2O_5$ content ranges from 1.02/1 to 1.4/1 and wherein the amount of the alkali metal oxide is less than 1%, said phosphate glass composition yielding a transparent glass which is characterized by a specific gravity ranging from about 2.5 to about 2.9, a dilatometric transformation temperature ranging from about 450° C. to about 750° C. and an average linear coefficient of thermal expansion in the temperature range of 100° C. to 300° C. ranging from about $40 \times 10^{-7}$ to about $90 \times 10^{-7}$ cm/cm°C.

2. A phosphate glass composition as in claim 1 containing from 8 to 38 wt% $SiO_2$ and $GeO_2$, provided that the $GeO_2$ content is not more than 6 wt%, and from 3 to 10 wt% $B_2O_3$.

3. A phosphate glass composition as in claim 1 or 2 wherein $TiO_2$ is the nucleating agent and it is present in an amount of up to 12 wt% based on the total composition of said glass.

4. A phosphate glass composition as in claim 1 or 2 wherein $ZrO_2$ is the nucleating agent and it is present in an amount of up to 6 wt% based on the total composition of said glass.

5. A phosphate glass composition as in claim 1 or 2 further containing a coloring agent.

6. A phosphate glass composition as in claim 1 further containing a dopant which provides a fluorescence property.

7. A phosphate glass composition as in claim 1 or 2 wherein gold is the nucleating agent and it is present in an amount of up to 0.02 wt% based on the total composition of said glass.

8. A phosphate glass composition as in claim 1 or 2 wherein silver is the nucleating agent and it is present in an amount of up to 0.1 wt% based on the total composition of said glass.

9. A phosphate glass composition as in claim 1 or 2 wherein $CeO_2$ is the nucleating agent and it is present in an amount of up to 3 wt% based on the total composition of said glass.

10. A phosphate glass composition capable of melting at about 1500° C. or lower consisting essentially of 32.7 wt% $P_2O_5$, 9 wt% $SiO_2$, 4.5 wt% $B_2O_3$, 22.5 wt% $Al_2O_3$, 25.8 wt% CaO and 5.4 wt% $TiO_2$.

11. A phosphate glass composition capable of melting at about 1500° C. or lower consisting essentially of 34.6 wt% $P_2O_5$, 9.5 wt% $SiO_2$, 4.8 wt% $B_2O_3$, 23.8 wt% $Al_2O_3$ and 27.3 wt% CaO.

* * * * *